US012802202B2

(12) United States Patent
Tondulkar et al.

(10) Patent No.: US 12,802,202 B2
(45) Date of Patent: Nov. 17, 2026

(54) DETECTING CONTIGUOUS DEFECT REGIONS OF A PHYSICAL OBJECT FROM CAPTURED IMAGES OF THE OBJECT

(71) Applicant: INTERNATIONAL BUSINESS MACHINES CORPORATION, Armonk, NY (US)

(72) Inventors: Rujuta Rohan Tondulkar, Mumbai (IN); Sujoy Kumar Roy Chowdhury, Kolkata (IN); Kartikeya Vats, Dehradun (IN); Ashish Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 18/502,989

(22) Filed: Nov. 6, 2023

(65) Prior Publication Data

US 2025/0148588 A1 May 8, 2025

(51) Int. Cl.

*G06T 7/00* (2017.01)
*G06T 7/13* (2017.01)
*G06T 15/00* (2011.01)
*G06V 10/25* (2022.01)
(Continued)

(52) U.S. Cl.

CPC .............. *G06T 7/0008* (2013.01); *G06T 7/13* (2017.01); *G06T 15/00* (2013.01); *G06V 10/25* (2022.01); *G06V 10/46* (2022.01); *G06V 10/764* (2022.01)

(58) Field of Classification Search

CPC ......... G06T 7/0008; G06T 7/13; G06T 15/00; G06T 2207/10016; G06T 2207/20081; G06T 2207/20084; G06T 2207/30164; G06T 7/0004; G06T 7/11; G06T 7/174;
(Continued)

(56) References Cited

U.S. PATENT DOCUMENTS 10,579,875 B2 3/2020 Dal Mutto et al.
11,580,692 B2 2/2023 Saracchini et al.
2018/0211373 A1* 7/2018 Stoppa ...................... G06T 7/55
(Continued)

FOREIGN PATENT DOCUMENTS

WO 2020168094 A1 8/2020

OTHER PUBLICATIONS

Multiple Defects Inspection, Hong et al, Jan. 2023 (Year: 2023).*
(Continued)

*Primary Examiner* — Jianxun Yang
(74) *Attorney, Agent, or Firm* — CHIP LAW GROUP

(57) ABSTRACT

Provided are a computer program product, system, and method for detecting contiguous defect regions of a physical object from captured images of the physical object. Images are received of a physical object from different perspectives capturing different views of the physical object. Defect regions in the images are detected containing defects on surfaces of the physical object. A determination is made of categories of the defect regions. A determination is made as to whether defect regions of a category have a common boundary to form at least one contiguous defect region for the category. A determination is made of total spatial metric of any contiguous defect regions and non-contiguous defect regions for each of the categories. Information on the total spatial metric for the categories is provided to a quality assurance module to determine a quality of the physical object.

17 Claims, 7 Drawing Sheets

(51) Int. Cl.
*G06V 10/46* (2022.01)
*G06V 10/764* (2022.01)

(58) Field of Classification Search
CPC ...... G06V 10/25; G06V 10/46; G06V 10/764; G06V 10/82
See application file for complete search history.

(56) References Cited

U.S. PATENT DOCUMENTS

| | | | |
|---|---|---|---|
| 2018/0322623 A1 | 11/2018 | Memo et al. |
| 2019/0138786 A1 | 5/2019 | Trenholm et al. |
| 2020/0344449 A1 | 10/2020 | Allen et al. |

OTHER PUBLICATIONS

Azzari, Lucio, Federica Battisti, and Atanas Gotchev. "Comparative analysis of occlusion-filling techniques in depth image-based rendering for 3D videos." Proceedings of the 3rd workshop on Mobile video delivery. 2010.

Beckman, Gustavo H., Dimos Polyzois, and Young-Jin Cha. "Deep learning-based automatic volumetric damage quantification using depth camera." Automation in Construction 99 (2019): 114-124.

Besl, Paul J., and Neil D. McKay. "Method for registration of 3-D shapes." Sensor fusion IV: control paradigms and data structures. vol. 1611. International Society for Optics and Photonics, 1992.

Dellen, Babette, and Iván Andrés Rojas Jofre. "Volume measurement with a consumer depth camera based on structured infrared light." Proceedings of the 16th Catalan Conference on Artificial Intelligence, poster session. 2013.

Jadhav, Tushar R., and Santosh M. Kamble. "Volume measurement of object using computer vision." 2016 IEEE International Conference on Recent Trends in Electronics, Information & Communication Technology (RTEICT). IEEE, 2016.

Väänänen, P., and V. Lehtola. "Inpainting Occlusion Holes in 3D Built Environment Point Clouds." International Archives of the Photogrammetry, Remote Sensing & Spatial Information Sciences (2019).

Xu, Zhao, Rui Kang, and Ruodan Lu. "3D reconstruction and measurement of surface defects in prefabricated elements using point clouds." Journal of Computing in Civil Engineering 34.5 (2020): 04020033.

* cited by examiner

DETECTING CONTIGUOUS DEFECT REGIONS OF A PHYSICAL OBJECT FROM CAPTURED IMAGES OF THE OBJECT

BACKGROUND OF THE INVENTION

1. Field of the Invention

The present invention relates to a computer program product, system, and method for detecting contiguous defect regions of a physical object from captured images of the physical object.

2. Description of the Related Art

Manufacturers perform quality assurance on products to determine the extent of defects on an object, such as dents, scratches, spoilage, contamination, etc., to determine whether to accept or reject a manufactured product Manual inspection of products for quality assurance may be time consuming and have accuracy issues. Computer vision is also being used to identify and determine quantities of defects in manufactured components using machine learning.

SUMMARY

Provided are a computer program product, system, and method for detecting contiguous defect regions of a physical object from captured images of the physical object. Images are received of a physical object from different perspectives capturing different views of the physical object. Defect regions in the images are detected containing defects on surfaces of the physical object. A determination is made of categories of the defect regions. A determination is made as to whether defect regions of a category have a common boundary to form at least one contiguous defect region for the category. A determination is made of total spatial metric of any contiguous defect regions and non-contiguous defect regions for each of the categories. Information on the total spatial metric for the categories is provided to a quality assurance module to determine a quality of the physical object.

DETAILED DESCRIPTION

Described embodiments provide improvements to computer technology for estimating a total spatial measurement of defect regions and a number of defect regions on a physical object that accounts for contiguousness of defect regions that spans multiple surface views and images. Described embodiments provide improved techniques to accurately determine a volume or area of a contiguous defect region by processing the defect regions that have boundary points in close proximity as contiguous defect regions to remove the effect of overlapping points in the defect region by subtracting the intersection or overlapping areas of multiple defect regions. The calculated accurate measurements of defect region metrics and the number of defect regions comprise predictive information of defects of a physical object that are provided to a quality assurance module to determine whether an object should be accepted or rejected based on the defect size and spatial metric of the defect regions for defect categories.

Figure 1:
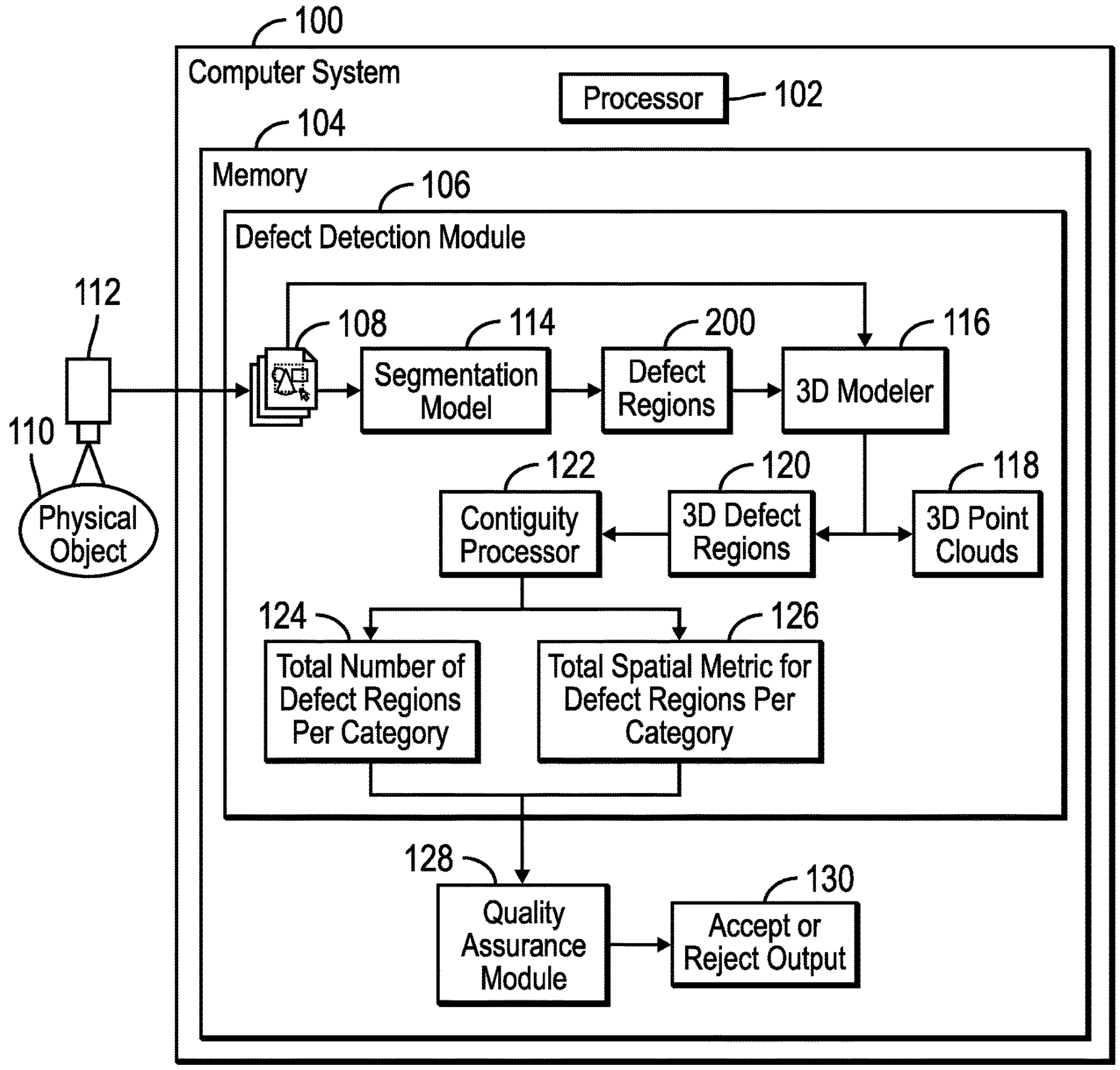
FIG. 1 illustrates an embodiment of a system for determining contiguous defect regions from images of a physical object.

FIG. 1 illustrates an embodiment of a computer system 100 in which described embodiments are implemented. The system 100 includes a processor 102 and a main memory 104 including a defect detection module 106 to process defects in images 108 of a physical object 110 captured by a camera 112. The camera 112 may comprise an RGB-D camera having a depth (D) sensor to capture both an RGB image and a depth frame of the depth of objects in the image for each picture taken of the physical object 110 from different perspectives and views. A segmentation model 114 uses machine learning to detect two-dimensional (2D) defect regions in each image 108 comprising defects on the physical object 110. The segmentation model may 112 comprise a convolutional neural network (CNN), such as the Mask R-CNN model, to defect different defect regions, or masks, of defects on the surface of the physical object 110 represented in an image 108.

The segmentation model 114 produces an image defect region 200 for each defect region on the physical object 110 for different categories of defects represented in the image 108 detected by the segmentation model. A three-dimensional (3D) modeler 116 processes the images 108 and depth frames for each image 108 to generate a 3D point cloud 118 for each image 108. The 3D modeler 116 may further process the image defect regions 200 to map the 2D defect regions 200 to 3D space in the 3D defect regions 120. The 3D defect regions 120 may be provided to the contiguity processor 122 to determine separate defect regions 200 for a category that form contiguous defect regions. Identification of contiguous defect regions allows a determination of the total number of contiguous and non-contiguous defect regions per defect category 124 and a total spatial metric for the contiguous and non-contiguous defect regions per category 126. This information 124, 126 allows an accurate measurement of defect regions that may extend across images in the entire 3D representation of the physical object.

The system 100 may further include, or be in communication with, a quality assurance module 128 that processes the information 124 and 126 on the defect regions for different defect categories to determine whether to accept or rejection the physical object 110 during manufacturing or processing. The quality assurance module 128 may output an accept or reject 130 classification of the physical object. The quality assurance module 128 may comprise a machine learning classifier that receives as input information on the physical object 110 and the defect regions 200 for each category of defects to classify the physical object 110 as a reject or accept 130. The quality assurance module 128 may be within the computer system 100 having the defect detection module 106 or a different system, such as in the cloud.

The camera 112 may comprise an RGB-D or depth camera to capture depth information along with RGB color data, and may consist of one RGB camera and multiple infrared (IR) cameras for computing depth information.

The memory 104 may comprise suitable volatile or non-volatile memory devices known in the art. For instance. The memory 104 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (Efram), nanowire-based non-volatile memory, and Direct In-Line Memory Modules (DIMMs), NAND storage, e.g., flash memory, Solid State Drive (SSD) storage, non-volatile RAM, etc.

Generally, program modules, such as the program components 106, 114, 116, 122, and 128 may comprise routines, programs, objects, components, logic, data structures, and so on that perform particular tasks or implement particular abstract data types. The program components and hardware devices of the system 100 may be implemented in one or more computer systems, where if they are implemented in multiple computer systems, then the computer systems may communicate over a network.

The program components 106, 114, 116, 122, and 128, among others, may be accessed by the processor 102 from the memory 104 to execute. Alternatively, some or all of the program components 106, 114, 116, 122, and 128 may be implemented in separate hardware devices, such as Application Specific Integrated Circuit (ASIC), Field Programmable Gate Arrays (FPGAs) and other hardware devices.

The functions described as performed by the program components 106, 114, 116, 122, and 128, among others, may be implemented as program code in fewer program modules than shown or implemented as program code throughout a greater number of program modules than shown.

Certain of the components, such as the segmentation model 114 and quality assurance module 128, may use machine learning algorithms. Program components implemented as machine learning models, such as 112 and 126, may be implemented in a separate Artificial Intelligence (AI) hardware accelerator.

The arrows shown in FIG. 1 between the components in the memory 104 represent a data flow between the components.

In certain embodiments, the segmentation model 114, and other components, e.g., 122, 128, may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs. In backward propagation, used to train a neural network machine learning model, biases at nodes in the hidden layer are adjusted accordingly to produce a defect classification of regions in the images comprising polygonal boundaries in the images. For instance, the input to the segmentation model 114 may comprise the images 108 and the segmentation model 114 may produce one or more defect classifications of polygonal boundaries with confidence levels. The biases at the nodes in the hidden layer of the segmentation model 114 may be trained to produce the defect classification for product information and product recommendations, respectively, based on the input images. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

For instance, the segmentation model 114 machine learning algorithm may be trained to detect defect regions 200 in the images 108 comprising polygonal boundaries in the images. The segmentation model 114 machine learning algorithm may be trained on a data set of images having polygonal boundaries, labeled as defect regions or non-defect regions, to recognize polygonal boundaries labeled as defect regions as defect regions with a high confidence level. Further, the segmentation model 114 machine learning model may be trained on the data set to recognize polygonal boundaries, labeled as non-defect regions, as non-defect regions with a high confidence level.

In backward propagation used to train a neural network machine learning module, such as the segmentation model 114, margin of errors are determined based on a difference of the calculated predictions and user rankings of the output. Biases (parameters) at nodes in the hidden layer are adjusted accordingly to minimize the margin of error of the error function.

In an alternative embodiment, the components, such as the segmentation model 114, may be implemented not as a machine learning module, but implemented using a rules based system to determine the outputs from the inputs. The components, such as the segmentation model 114, may further be implemented using an unsupervised machine learning module, or machine learning implemented in methods other than neural networks, such as multivariable linear regression models.

Figure 2:
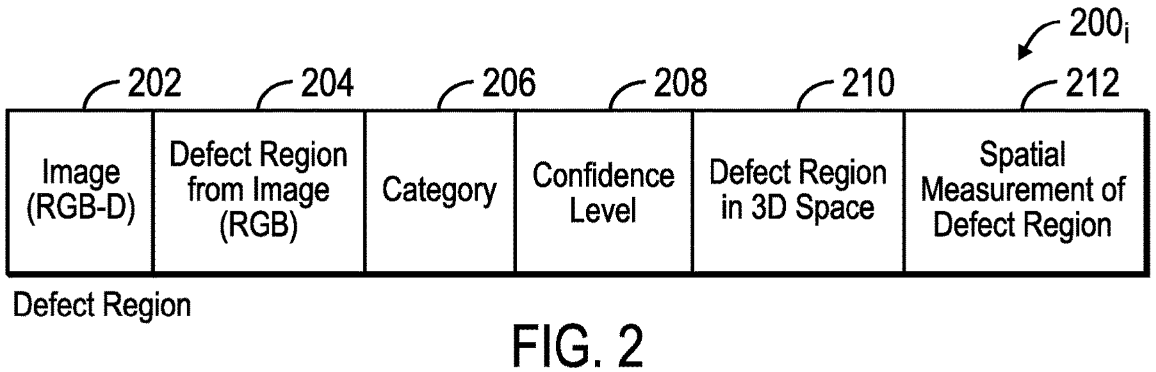
FIG. 2 illustrates an embodiment of information on a defect region detected on a surface of a physical n object.

FIG. 2 illustrates an embodiment of an instance image defect region 200; for an image defect region determined by the segmentation model 114 from one of the images 108, and may include: the image 202 from which the defect region was detected by the segmentation model 114; the defect region 204 detected from the image 202, such as a boundary of the defect region comprising a polygon in 2D space; a category 206 of the defect, such as scratches, dent, contamination, spoilage, etc.; a confidence level 208 of the detected region and category; a defect region in 3D space 210; and a spatial measurement 212 of the defect region 204, which may comprise an area or volume.

Figure 3A:
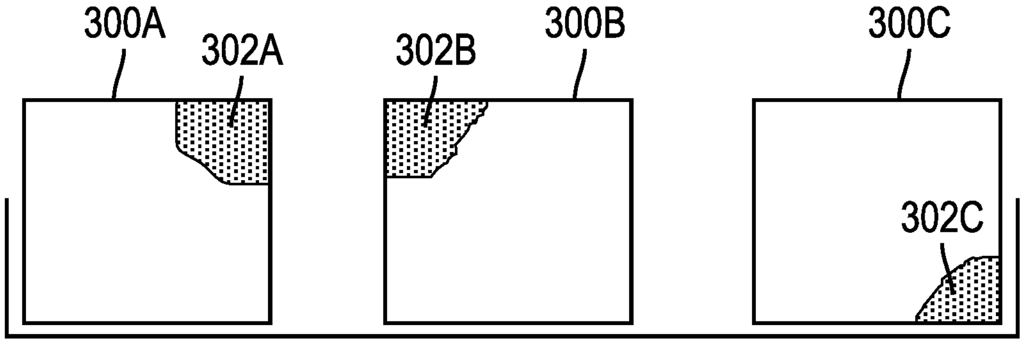
FIGS. 3A, 3B, 3C, and 3D illustrate examples of how the contiguousness of defect regions on surfaces may vary depending on the arrangement of surfaces in a three-dimensional (3D) representation of the physical object.
Figure 3B:
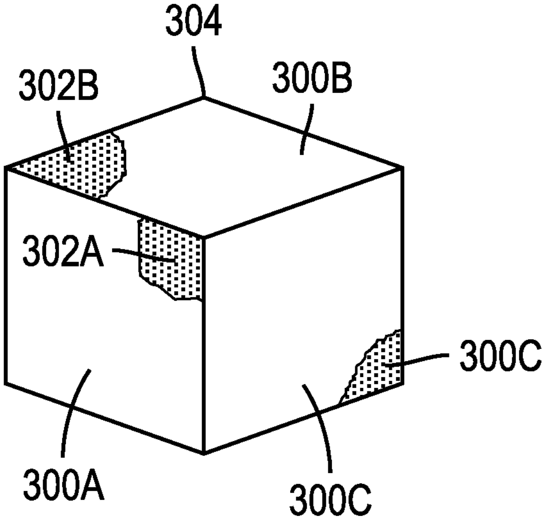
Figure 3C:
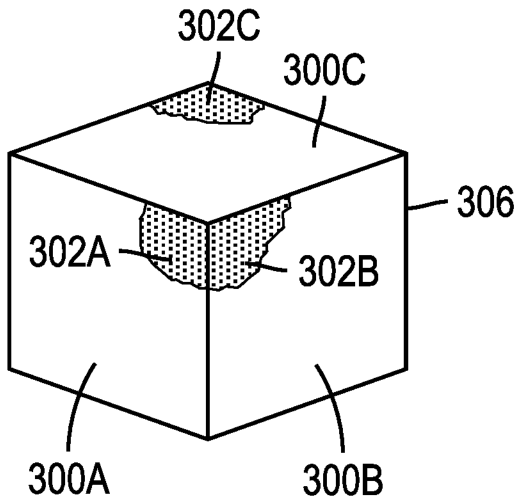
Figure 3D:
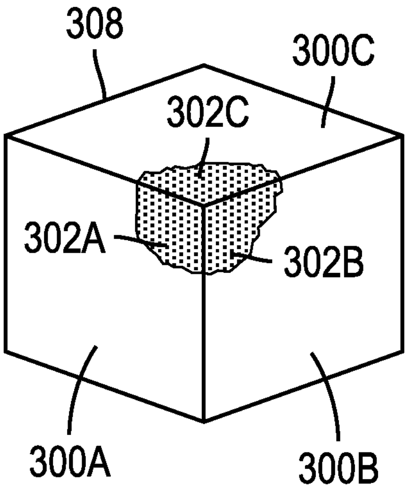

FIG. 3A shows three surfaces 300A, 300B, 300C of a physical object having defect regions 302A, 302B, 302C, respectively. FIG. 3B shows an arrangement of the surfaces 300A, 300B, 300C on a physical object 304 where all the defect regions 302A, 302B, 302C are discontiguous. FIG. 3C shows an alternative arrangement of the surfaces 300A, 300B, 300C on physical object 306 where two of the defect regions 302A, 302B are contiguous on different surfaces 300A, 300B, and defect region 302C is discontiguous to the other defect regions 302A, 302B. FIG. 3D shows a yet further alternative arrangement of the surfaces 300A, 300B, 300C on physical object 308 where all of the defect regions 302A, 302B, 302C are contiguous on different surfaces.

FIGS. 3A, 3B, 3C, and 3D illustrate how the determination of defect regions 302A, 302B, 302C on the individual surfaces 302A, 302B, 302C that are captured in 2D images, such as shown in FIG. 3A, does not indicate whether the defect regions 302A, 302B, 302C are contiguous or non-contiguous when present on physical objects 304, 306, 308. Thus, the three physical objects 304, 306, 308 can have the same surfaces and the same defect regions, yet whether those defect regions are discontiguous or contiguous cannot be determined from the detection on the 2D images alone.

Figure 4:
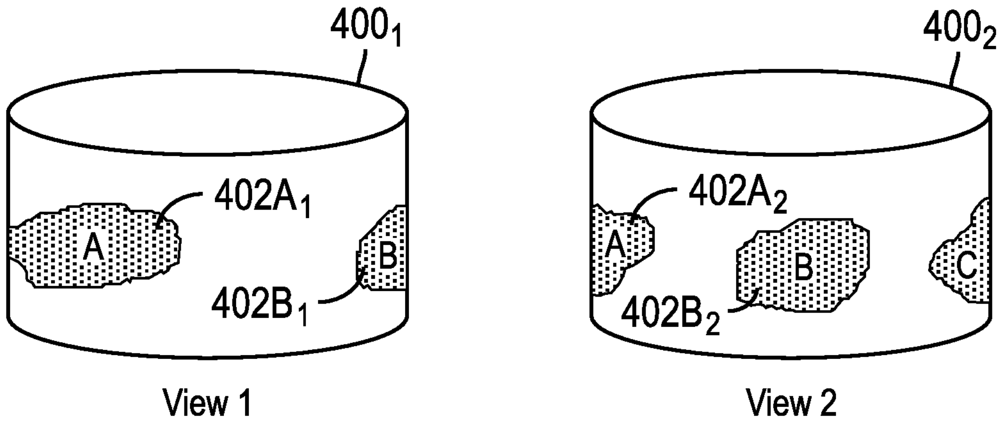
FIG. 4 illustrates how defect regions appear differently from different views of a physical object.

FIG. 4 shows two overlapping views of an object 4001, 4002, which may be captured in different images. Each view 4001, 4002 shows the defect regions A and B to have different sizes 402A1 versus 402A2, 402B1 versus 402B2. Again, this shows how the perspective of a 2D image may result in different determinations of a size and extent of a defect region.

FIGS. 3A, 3B, 3C, 3D and 4 illustrate how determination of a size and extent of a defect region requires a holistic view of the object and cannot be determined from regions detected on images providing different perspectives of the view of an object. Described embodiments provide techniques to accurately determine whether different defect regions detected from multiple images of an object are contiguous or discontiguous on the physical object itself.

Figure 5:
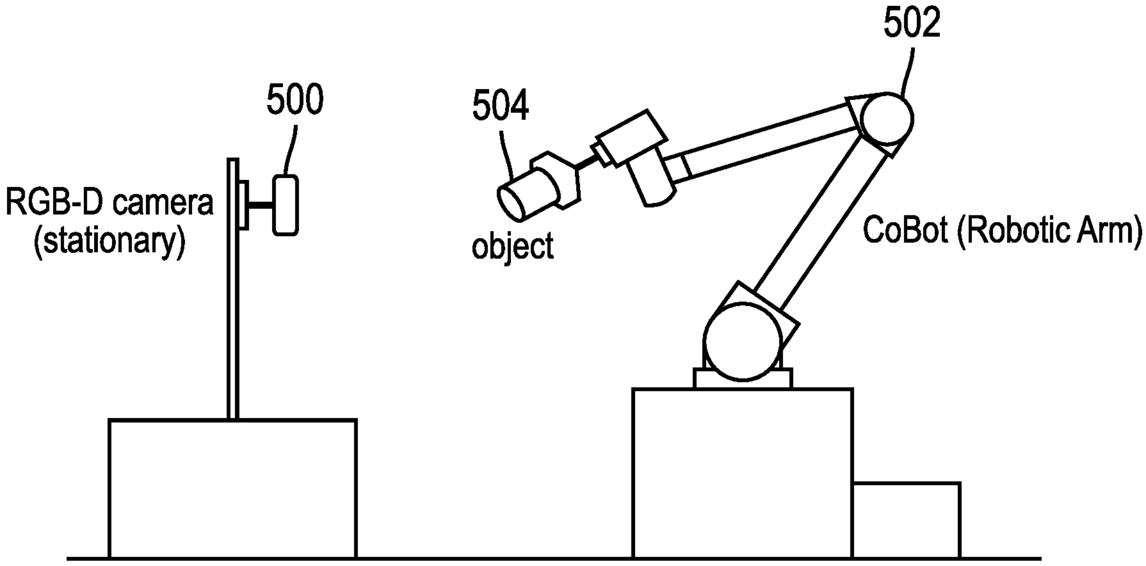
FIG. 5 illustrates an embodiment of a camera and robotic arm holding an object to capture images taken from different views and angles with respect to the physical object.

FIG. 5 illustrates an embodiment of how the RGB-D camera 500, such as camera 112, is maintained in a fixed position, and a robotic arm 502, cobot, can rotate and move the physical object 504 into different positions with respect to the fixed camera 500 to allow the camera 500 to capture images of the object 504 from different views and perspectives, and at different angles with respect to the fixed camera 500. In an alternative frame of reference, the camera 500 may rotate and the object may be in a fixed, stationary position, and the camera is moved to capture views of the object from different angles. Further, for large objects, multiple cameras can be set up at pre-calculated angles around the object position in order to capture images of the object from different perspectives.

In an alternative embodiment, the object can be placed on a conveyor belt and multiple cameras can record videos while the object is in motion. Analysis is done by extracting the RGB-D frames from the video and then processing them as described herein. This setup can be viewed with a different frame of reference, wherein the object and camera swap locations i.e. the object is stationary and the camera is moved around the object in order to capture the required views.

In case of large objects, multiple cameras can be set up at pre-calculated angles around the object position in order to achieve the same result.

Alternatively, the object can be placed on a conveyor belt and multiple cameras can record videos while the object is in motion. Analysis is done by extracting the RGB-D frames from the video and then processing them as usual.

Figure 6:
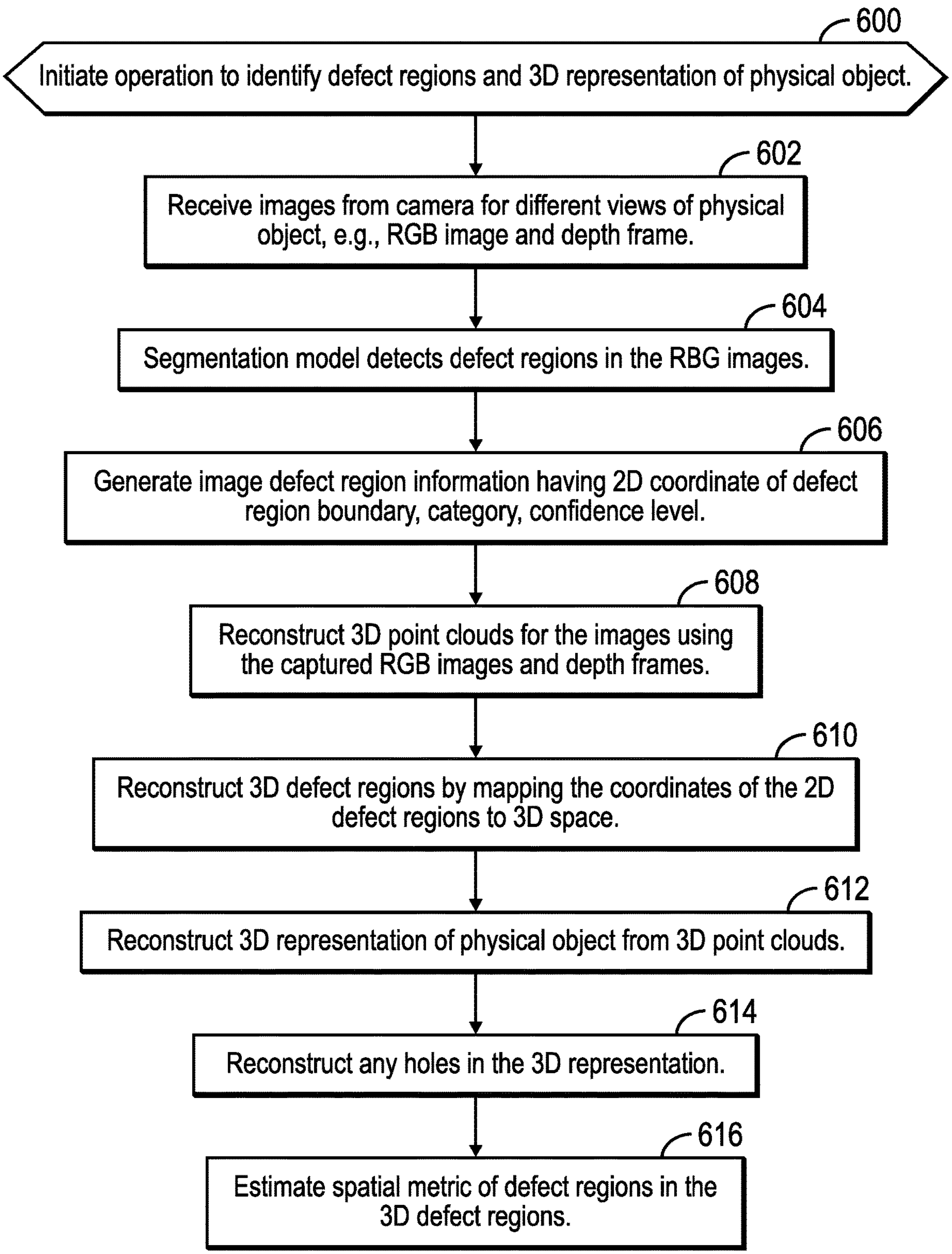
FIG. 6 illustrates an embodiment of operations to reconstruct 3D representations of a physical object from images a camera captures of the physical object.

FIG. 6 illustrates an embodiment of operations performed by the defect detection module 106 to detect the images 108, identify the class/category of the defects, detect a precise boundary of the defect regions, and determine a spatial metric measuring a size of the defect region, such as in volume or area. Upon initiating (at block 600) an operation to identify defect regions and a 3D representation of a physical object 110, images 108 are received (at block 602) from camera 112 for different views of the physical object 110, e.g., RGB image and depth frame. The segmentation model 114 processes (at block 604) the images 108 to detect and categorize defect regions 200 in the images 108. The defect detection module 106 generates (at block 606) image defect region information 200; for each detected defect region having, for each detected defect region, the 2D coordinates of a defect region boundary, a classification, and a confidence level. The 3D modeler 134 reconstructs (at block 608) 3D point clouds 118 from the images 108 using the captured RGB image 108 and depth frame. The 3D modeler 116 may align the RGB frame and depth frame from the images 108 for the object to obtain 3D coordinates in a 3D space for each image 108 view. In one embodiment, the 3D modeler 116 may use iterative closest point (ICP) alignment to reconstruct the 3D point clouds and a 3D representation of the physical object 110.

The 3D modeler 14 may further reconstruct (at block 610) 3D defect regions 120 by mapping points from the 2D image defect regions 200 to 3D defect regions 120. The 3D modeler 134 may further reconstruct (at block 612) a 3D representation of the physical object 110 from the 3D point clouds 116.

If (at block 614) there are any occluded points or holes in the 3D point clouds 118, then such data for the holes or missing data in the 3D reconstruction may be further generated and reconstructed. The 3D modeler 116 may further estimate (at block 616) spatial metrics of the 3D defect regions 120, such as an area or volume of the defect regions. The area/volume may be estimated for a 3D defect region 120 using triangular meshes on multiple views of all the surfaces.

The embodiment of FIG. 6 provides techniques to generate 3D representation of the different images 108 to provide 3D representations of the view from which the detected regions 200 were determined, so that 3D defect regions 120 can be generated that define the defect regions in a 3D space. This information may then be used to determine which defect regions 200 from the segmentation model 114 in 2D space are contiguous forming a single contiguous defect region.

Figure 7A:
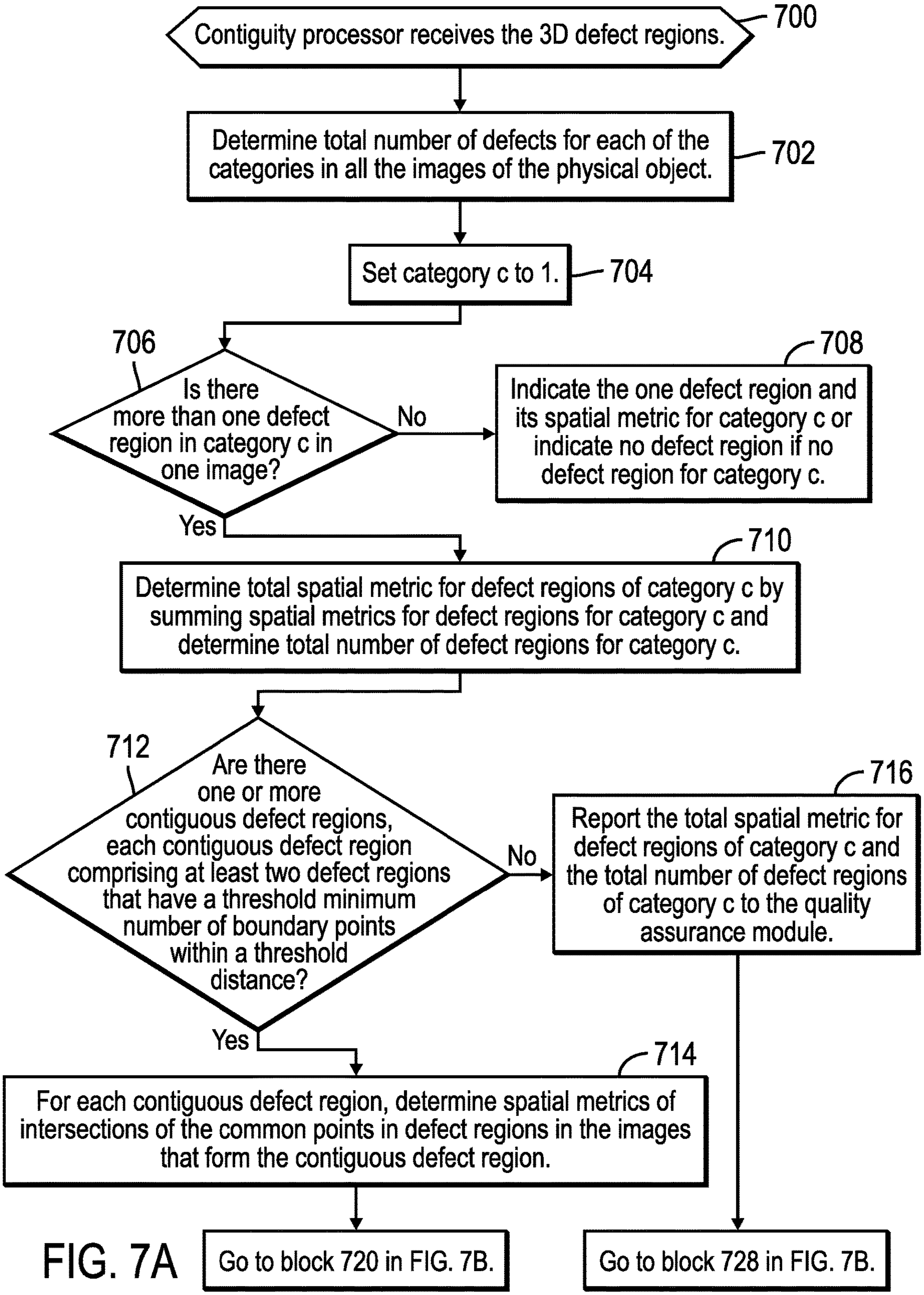
FIGS. 7A and 7B illustrate an embodiment of operations to calculate a number of defect regions and total spatial metric of defect regions to account for contiguousness of the defect regions.
Figure 7B:
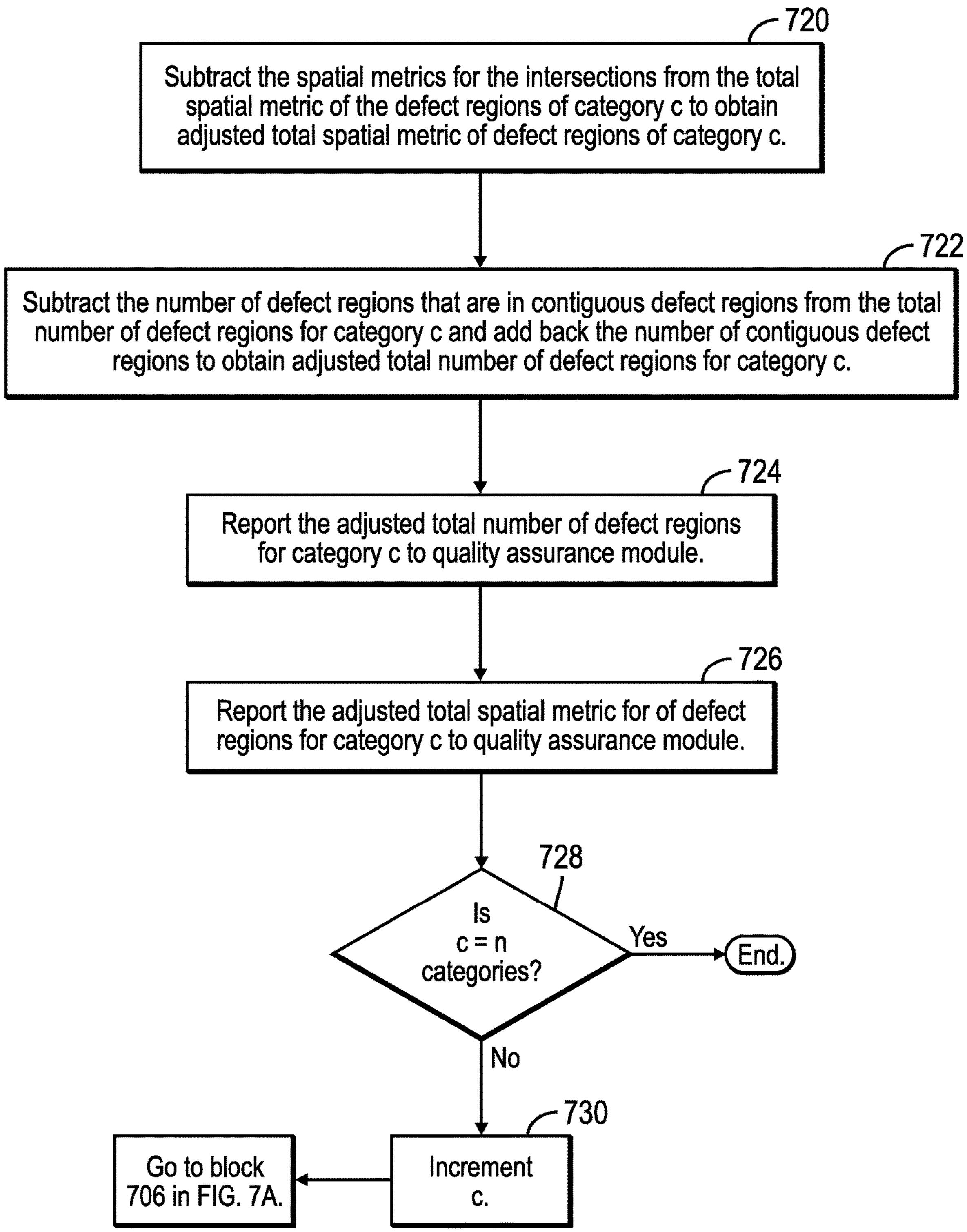

FIGS. 7A and 7B provide an embodiment of operations performed by the contiguity processor 122 to determine defect regions 200 in images 108 that are in fact contiguous defect regions, not discontiguous regions, in order to provide accurate information on the number of defect regions and total spatial metric of the defect regions for different defect categories. Upon the contiguity processor 122 receiving (at block 700) 3D defect regions 120 or the image defect regions 204 for a physical object 110, the contiguity processor 122 determines (at block 702) a total number of defects for each of the categories in the images. The category c is set (at block 704) to one for the first category. The contiguity processor 122 then performs a loop of operations at block 706 through 734 for each category c of possible categories assigned by the segmentation model 114. If (at block 706) there is not more than one defect region 200 for category 206 of c, then the contiguity processor 122 indicates (at block 708) the one defect region 204 and its spatial 212 if there is one defect region or no defect region information if there are no defect regions 200; for category c. If (at block 706) there is more than one defect region of category c, then the contiguity processor 122 determines (at block 710) a total spatial metric, e.g., volume or area, for the defect regions of category c by summing spatial metrics 212 for defect regions 200; for category c and determine total number of defect regions for category c by summing all the defect regions 200; whose category 206 is category c.

If (at block 712) there are one or more contiguous defect regions, each defined as having at least two defect regions that have a threshold minimum number of boundary points within a threshold distance, then the contiguity processor 122 determines (at block 714), for each contiguous defect region having defect regions of common boundaries, the spatial metrics of intersections of the common points in each of the defect regions in the images, such as 3D point clouds 118, that form the contiguous defect region. If (at block 712) there are no contiguous defect regions for category c, i.e., only discontiguous regions, then the contiguity processor 122 reports (at block 716) the total spatial metric for the discontiguous defect regions of category c and the total number of discontiguous defect regions of category c to the quality assurance module 128. Control then proceeds to block 728 in FIG. 7B.

After determining the intersections for contiguous defect regions (at block 714), the contiguity processor 122 proceeds to block 720 in FIG. 7B where the contiguity processor 122 subtracts the spatial metrics for the intersections, e.g., area or volume, from the total spatial metric of the defect regions of category c to obtain adjusted total spatial metric of defect regions of category c, where overlapping points of defect regions in different images are not counted twice. The number of defect regions that are in contiguous defect regions are subtracted (at block 722) from the total number of defect regions for category c and then the number of contiguous defect regions are added back to obtain the adjusted total number of defect regions for category c that consolidates multiple defect regions in one contiguous defect region into a single contiguous defect region for counting purposes. The contiguity processor 122 reports (at block 724) the adjusted total number of defect regions for category c to the quality assurance module 128. The adjusted total spatial metric of defect regions for category c is sent (at block 726) to the quality assurance module 128. From block 726 or from block 716 (FIG. 7A), if (at block 728) category c is equal to the last n category, then control ends. Otherwise, if (at block 728) c is less than the last n category considered, then c is incremented (at block 730) and control proceeds back to block 706 to determine total spatial metric of the defect regions and the number of defect regions for a next category.

The operations of FIGS. 7A and 7B provide an embodiment to determine a contiguous defect region comprised of defect regions on different views. By determining contiguous defect regions or defect regions that appear as discontiguous from the image 108 view but are not, the described embodiments can accurately determine a number of defect regions and a spatial metric/measurement of volume or area of the defect regions. The number and size of defect regions for different categories may be used by the quality assurance module 128 to determine whether a physical object 110 having these contiguous and non-contiguous defect regions should be accepted or rejected as part of quality assurance.

If both the defects were to belong to a different category, or the contours for the defect are outside the tolerance of distance of each other, or the number of boundary points are less than the acceptable threshold, then the pair of defects can be determined as non-contiguous.

In one embodiment, the determination at block 712 of the threshold distance may comprise tolerance of distance ($\epsilon$) is a tunable parameter that accounts for the error in contour boundaries for the defect regions. The tolerance of distance may depend on factors such as mesh size, algorithm accuracy and business acceptability of overlap. This operations by, if, for two contours, each point in a first contour is mapped to a point in the second contour. The minimum distance to find the closest point is then compared with the tolerance of distance. Every point in the 2D contour of a defect region is identified in 3D mesh by 3D coordinates/voxel coordinates. For instance, a point P1 (x_1,y_1,z_1) on the contour C1 of defect 1 is said to be a neighbor of a point P2 (x_2,y_2,z_2) on the contour C2 if the following are true:

If $d(P_1,P_2)<\epsilon$ where $\epsilon$ is the tunable tolerance of distance and d(.) is a distance metric typically Euclidean or Manhattan distance $$d(P_1, P_2) = \min(\{d(P_1, P_b)\forall\, b \in C_2 \text{ and } d(P_1, P_b) < \epsilon\})$$

$$d(P_2, P_1) = \min(\{d(P_2, P_a)\forall\, a \in C_1 \text{ and } d(P_2, P_a) < \epsilon\})$$

If the number of boundary points exceed a certain threshold K_min (tunable parameter), the defects are marked as a contiguous defect. The parameters ε and K_min depend on the 3D mesh/voxel resolution, the number of points chosen to define the contour in 2D, and hyperparameters of an alignment algorithm, e.g., ICP. The choice of & mapped-to-physical dimensions via the 3D mesh/voxel resolution provide the minimum error tolerance in 3D for two separated defects to be considered as one contiguous defect. The parameter K_min mapped-to-physical dimensions via the 3D mesh/voxel resolution is determined by the minimum amount of overlap in contour required to consider two defects as overlapping.

With the embodiment of FIGS. 7A and 7B, the operation to subtract an intersection to remove overlapping region when combining defect regions into a contiguous defect region, for regions A and B, may be represented by the operation of $S(Q)=S(A)+S(B)-S(A\cap B)$, where S(Q) is the measurement of combining A and B defect regions by summing the space of the defect regions S(A) and (SB) minus the intersection of A and B. If there is a third defect region C, then to combine the three regions A, B, C into a contiguous region would require subtraction of intersections of common points in the region as shown in the equation (1) below:

$$S(R) = S(A) + S(B) + S(C) - S(A \cap B) - S(B \cap C) - S(A \cap C) + S(A \cap B \cap C) \quad (1)$$

However, in certain embodiments, to simplify the operation and avoid the complication of adding the last term, the determination of space, e.g., volume or area, of a region R, can be performed in a nested fashion by combining A and B into contiguous defect Q, before combining with C as shown below in equation (2):

$$S(R) = S(Q) + S(C) - S(Q \cap C) \quad (2)$$

Performing stepwise and nested operations to determine a combined spatial metric with more than two defect regions avoids having to compute a three-way intersection area.

In further embodiments, defect regions may be combined into a contiguous region by determining whether each possible pair of defect regions share a common boundary for a category. For every pair of defects within each category, the contiguity processor 10 may determine if the points (3D space coordinates) on the contours of the defects are within a tolerance of distance of each other. The points that satisfy this tolerance criteria are said to be within epsilon neighborhood of each other and are referred to, as "boundary points". In further embodiments, for contiguous and non-contiguous defect regions, the contiguity processor 122 may determine the area/volume of the defect regions for each defect, if the points interior to said defect appear in surface views. If the points interior to a defect region are not in multiple surface views, then there is no further action because the total spatial metric of all the defect regions for a category can be determined by summing and adding up the detected defect regions. However, if the interior points of a defect appear in multiple surface views, then the contiguity processor 122 may perform a voting algorithm to take majority voting from the surface views or the highest confidence score in the case of a tie to decide on the common points for a contiguity region.

The contiguity processor 122 calculates an overlapping area/volume of all the common points determined, through majority voting, in the intersection of the combined defect regions. The overlapping area/volume may comprise the total area/volume of all the points that overlap in the 2D image 108 views. In this way, for each category, the contiguity processor 122 determines the total area/volume for the intersection of the defect regions that has to be deducted from the total spatial metric of the contiguous defect region to arrive at the correct spatial metric/measurement of the contiguous defect region formed from overlapping defect regions having boundary points.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
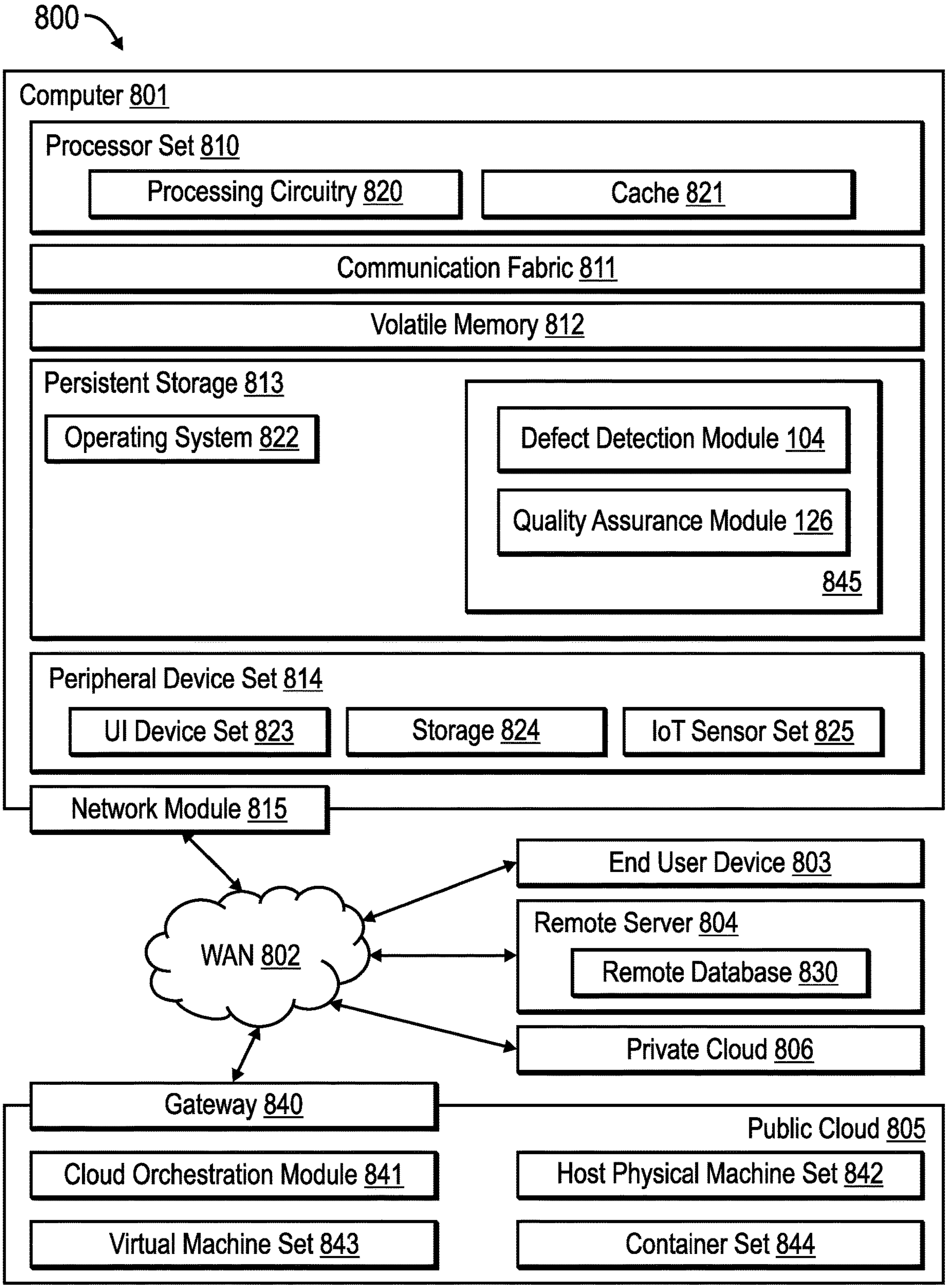
FIG. 8 illustrates a computing environment in which the components of FIG. 1 may be implemented.

With respect to FIG. 8, computing environment 800 contains an example of an environment for the execution of at least some of the computer code involved in performing the inventive methods, such as the operations performed by the defect detection module 106 to detect defect regions on a physical object and the quality assurance module 128, described with respect to FIG. 1, to assess the quality of the physical object based on the detected defect regions, in block 845. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845 as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The letter designators, such as c and n, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting defects on a physical object, the computer program product comprises a computer readable storage medium having program instructions embodied therewith that when executed cause operations, the operations comprising:

receiving two-dimensional images of the physical object from different perspectives capturing different views of the physical object;

detecting defect regions in the two-dimensional images containing the defects on surfaces of the physical object;

determining categories of the defect regions in the two-dimensional images;

determining whether the defect regions of a category of the categories in the two-dimensional images have a common boundary to form at least one contiguous defect region for the category;

reconstructing three-dimensional defect regions from the defect regions in the two-dimensional images;

determining total spatial metric of any contiguous three-dimensional defect regions and non-contiguous three-dimensional defect regions for each of the categories, wherein the determining of the total spatial metric comprises:

for each contiguous defect region, comprised of multiple detected defect regions, determining spatial metrics of intersections of common points in each pair of defect regions that form the contiguous defect region; and subtracting the spatial metrics of the intersections of the common points from a total of the spatial metrics of all the detected defect regions of the category; and providing information on the total spatial metric for the categories to a quality assurance module to determine a quality of the physical object.

2. The computer program product of claim 1, wherein the operations further comprise:

determining a total number of contiguous defect regions and non-contiguous defect regions for each of the categories, wherein the providing of the information comprises providing the total number of the contiguous defect regions and the non-contiguous defect regions for each of the categories.

3. The computer program product of claim 2, wherein the determining of the total number of the contiguous defect regions and the non-contiguous defect regions for the category comprises;

subtracting detected defect regions in the contiguous defect regions from a total number of the detected defect regions of the category; and adding back a number of the contiguous defect regions for the category.

4. The computer program product of claim 1, wherein the operations further comprise:

mapping the defect regions in the two-dimensional images to the three-dimensional defect regions in a three-dimensional image formed from the two-dimensional images, wherein the determining of whether the defect regions of the category have the common boundary comprises determining whether the three-dimensional defect regions of the defect regions in the two-dimensional images having the category have the common boundary.

5. The computer program product of claim 1, wherein the determining of whether the defect regions of the category have the common boundary comprises performing for each pair of defect regions of the category:

determining whether defect regions of a pair of defect regions of the category have the common boundary and form a contiguous defect;

determining an overlapping region of the defect regions, of the pair of defect regions, that are contiguous; and determining other defect regions of the category having common points in the overlapping region of the contiguous defect as a sum of spatial measurements of the pair of defect regions forming the contiguous defect minus a spatial measurement of an intersection of the spatial measurement of the pair of defect regions, wherein the spatial measurement is provided to determine the quality of the physical object.

6. The computer program product of claim 1, wherein the determining of whether the defect regions have the common boundary comprises:

determining whether a minimum number of pairs of points in the defect regions are within a tolerance distance, wherein the defect regions are determined to have the common boundary in response to determining that the minimum number of the pairs of points in the defect regions are within the tolerance distance.

7. The computer program product of claim 1, wherein the operations further comprise:

determining a pair of defect regions to be non-contiguous with respect to each other in response to determining at least one of that: the pair of defect regions have different categories; contours of the defect regions are separated by more than a threshold distance; and a number of boundary points on the defect regions are less than acceptable threshold number of the boundary points.

8. The computer program product of claim 1, wherein the determining of whether the defect regions for the contiguous defect region comprises:

determining whether interior points of a defect region of the defect regions appear in multiple surface views of the two-dimensional images; and in response to determining that the interior points of the defect region appear in the multiple surface views of the two-dimensional images, performing one of:

using majority voting from the multiple surface views to determine the common points in the contiguous defect region; and determining the common points in the two-dimensional images having a surface view with a highest confidence level of the category from the two-dimensional images including the interior points of the defect region.

9. The computer program product of claim 1, wherein the operations further comprise:

processing, by a machine learning model, the two-dimensional images to detect the defect regions in the two-dimensional images comprising polygonal boundaries in the two-dimensional images;

training the machine learning model on a data set of two-dimensional images having polygonal boundaries labeled as defect regions or non-defect regions to recognize the polygonal boundaries labeled as the defect regions as the defect regions with a high confidence level; and training the machine learning model on the data set to recognize the polygonal boundaries labeled as the non-defect regions as the non-defect regions with the high confidence level.

10. A system, comprising:

a processor; and a computer readable storage medium having program instructions embodied therewith that when executed by the processor causes operations, the operations comprising:

receiving two-dimensional images of a physical object from different perspectives capturing different views of the physical object;

detecting defect regions in the two-dimensional images containing defects on surfaces of the physical object;

determining categories of the defect regions in the two-dimensional images;

determining whether the defect regions of a category of the categories in the two-dimensional images have a common boundary to form at least one contiguous defect region for the category;

reconstructing three-dimensional defect regions from the defect regions in the two-dimensional images;

determining total spatial metric of any contiguous three-dimensional defect regions and non-contiguous three-dimensional defect regions for each of the categories, wherein the determining of the total spatial metric comprises:

for each contiguous defect region, comprised of multiple detected defect regions, determining spatial metrics of intersections of common points in each pair of defect regions that form the contiguous defect region; and subtracting the spatial metrics of the intersections of the common points from a total of the spatial metrics of all the detected defect regions of the category; and providing information on the total spatial metric for the categories to a quality assurance module to determine a quality of the physical object.

11. The system of claim 10, wherein the operations further comprise:

determining a total number of contiguous defect regions and non-contiguous defect regions for each of the categories, wherein the providing of the information comprises providing the total number of the contiguous defect regions and the non-contiguous defect regions for each of the categories.

12. The system of claim 10, wherein the operations further comprise:

mapping the defect regions in the two-dimensional images to the three-dimensional defect regions in a three-dimensional image formed from the two-dimensional images, wherein the determining of whether the defect regions of the category have the common boundary comprises determining whether the three-dimensional defect regions of the defect regions in the two-dimensional images having the category have the common boundary.

13. The system of claim 10, wherein the operations further comprise:

processing, by a machine learning model, the two-dimensional images to detect the defect regions in the two-dimensional images comprising polygonal boundaries in the two-dimensional images;

training the machine learning model on a data set of two-dimensional images having polygonal boundaries labeled as defect regions or non-defect regions to recognize the polygonal boundaries labeled as the defect regions as the defect regions with a high confidence level; and training the machine learning model on the data set to recognize the polygonal boundaries labeled as the non-defect regions as the non-defect regions with the high confidence level.

14. A method, comprising:

receiving two-dimensional images of a physical object from different perspectives capturing different views of the physical object;

detecting defect regions in the two-dimensional images containing defects on surfaces of the physical object;

determining categories of the defect regions in the two-dimensional images;

determining whether the defect regions of a category of the categories in the two-dimensional images have a common boundary to form at least one contiguous defect region for the category;

reconstructing three-dimensional defect regions from the defect regions in the two-dimensional images;

determining total spatial metric of any contiguous three-dimensional defect regions and non-contiguous three-dimensional defect regions for each of the categories, wherein the determining of the total spatial metric comprises:

for each contiguous defect region, comprised of multiple detected defect regions, determining spatial metrics of intersections of common points in each pair of defect regions that form the contiguous defect region; and subtracting the spatial metrics of the intersections of the common points from a total of the spatial metrics of all the detected defect regions of the category; and providing information on the total spatial metric for the categories to a quality assurance module to determine a quality of the physical object.

15. The method of claim 14, further comprising:

determining a total number of contiguous defect regions and non-contiguous defect regions for each of the categories, wherein the providing of the information comprises providing the total number of the contiguous defect regions and the non-contiguous defect regions for each of the categories.

16. The method of claim 14, further comprising:

mapping the defect regions in the two-dimensional images to the three-dimensional defect regions in a three-dimensional image formed from the two-dimensional images, wherein the determining of whether the defect regions of the category have the common boundary comprises determining whether the three-dimensional defect regions of the defect regions in the two-dimensional images having the category have the common boundary.

17. The method of claim 14, further comprising:

processing, by a machine learning model, the two-dimensional images to detect the defect regions in the two-dimensional images comprising polygonal boundaries in the two-dimensional images;

training the machine learning model on a data set of two-dimensional images having polygonal boundaries labeled as defect regions or non-defect regions to recognize the polygonal boundaries labeled as the defect regions as the defect regions with a high confidence level; and training the machine learning model on the data set to recognize the polygonal boundaries labeled as the non-defect regions as the non-defect regions with the high confidence level.

* * * * *